(12) United States Patent
Rosen et al.

(10) Patent No.: US 6,920,208 B1
(45) Date of Patent: Jul. 19, 2005

(54) CALL TRACKER

(75) Inventors: Kenneth H. Rosen, Middletown, NJ (US); Benjamin J. Stern, Morris Township, Morris County, NJ (US)

(73) Assignee: AT&T Corp., New York, NY (US)

( * ) Notice: Subject to any disclaimer, the term of this patent is extended or adjusted under 35 U.S.C. 154(b) by 371 days.

(21) Appl. No.: 10/138,917

(22) Filed: May 3, 2002

(51) Int. Cl.[7] .............................................. H04M 15/00
(52) U.S. Cl. ...................... 379/126; 379/116; 379/119; 379/127.01
(58) Field of Search ........................ 379/32.05, 114.28, 379/115.01, 116, 119, 121.04, 126, 127.01, 142.06, 220.01

(56) References Cited

U.S. PATENT DOCUMENTS

| | | | | |
|---|---|---|---|---|
| 5,940,484 A | * | 8/1999 | DeFazio et al. | 379/142.06 |
| 5,958,016 A | | 9/1999 | Chang et al. | |
| 6,091,808 A | | 7/2000 | Wood et al. | |
| 6,185,416 B1 | * | 2/2001 | Rudokas et al. | 455/410 |
| 6,211,972 B1 | * | 4/2001 | Okutomi et al. | 358/402 |
| 6,212,261 B1 | | 4/2001 | Meubus et al. | |
| 6,282,275 B1 | * | 8/2001 | Gurbani et al. | 379/142.06 |
| 6,385,301 B1 | * | 5/2002 | Nolting et al. | 379/32.01 |
| 6,459,779 B2 | * | 10/2002 | Wardin et al. | 379/112.01 |
| 6,470,079 B1 | * | 10/2002 | Benson | 379/114.13 |
| 6,539,077 B1 | * | 3/2003 | Ranalli et al. | 379/67.1 |
| 6,639,975 B1 | * | 10/2003 | O'Neal et al. | 379/112.01 |

\* cited by examiner

*Primary Examiner*—Bing Q. Bui
(74) *Attorney, Agent, or Firm*—Hoffmann & Baron, LLP

(57) ABSTRACT

A method is provided for subscriber-related call log information for a plurality of distributed services from a remotely accessible consolidating server. The distributed services include at least a plain old telephone service, a wireless service, and a long distance telephone service. The call log information for the plurality of services is received in the consolidating server from a network. The call log information may be stored in the server as a consolidated list sorted by at least one of name of a remote party, remote party telephone number, time of call, remote party mailing address, remote party e-mail address, and/or a remote number identifier. The consolidated list is communicated to a remote location responsive to a subscriber request. Such a remote location can be a general purpose computing device equipped with a web browser, an Internet-enabled phone, or a similar device. A transfer-hub may store the call log information. The transfer-hub may be Blued-enabled to communication with other devices for a Personal Local Area Network of a subscriber.

22 Claims, 4 Drawing Sheets

CALL TRACKER

FIELD OF THE INVENTION

The present invention generally relates to telecommunications processing, more particularly to a method and system for remote telephone call tracking.

BACKGROUND OF THE INVENTION

The Internet has become an important part of modern society. Numerous consumers use the Internet to purchase products on-line, locate special events, read news stories, pay bills or perform on-line banking. Numerous business establishments are connected to the Internet to provide products and services to the consumer or to perform business-to-business electronic commerce. The Internet has also helped telephony services. Telephone calls can be tracked so that a customer and/or a business enterprise can receive a list of calls they have made on a periodic or an on-going basis. The tracked calls can be in a report delivered on paper or electronically displayed. Telephone billing records are now being viewed and used on-line on the World Wide Web via a web page. However, these on-line billing systems lack full functionality to provide a network-based call management system.

It is known to provide a so-called telephone web page whereby subscribers can store personal telephone directories and personal call logs for calls made from and to a single telephone number. An example of such a telephone web page is described in U.S. Pat. No. 6,091,808 to Wood et al. ("Wood"). Notably, telephone web pages and the system of Wood do not provide a consolidated call log for a plurality of telephone numbers associated with a single subscriber. Further, the system of Wood does not integrate reverse directory look-up with a consolidated call log. Accordingly, there is a need for a system and method for providing network-based subscriber-related call logs that overcomes the deficiencies found in the conventional web telephone page and related systems.

SUMMARY OF THE INVENTION

The present invention pertains to an advanced network-based system and method for remote telephone call tracking; in particular, the call tracking is facilitated by the World Wide Web.

In one aspect, the present invention overcomes the problems in the telephony art by providing subscriber-related call log information for a plurality of distributed services from a remotely accessible consolidated server. In accordance with the invention, the call log information for the plurality of services is received in the consolidated server from a network and is stored in the server. The call log information may be stored as a consolidated list sorted by at least one of name of calling or called party, called or calling party telephone number, time of call, calling party or called party mailing address, calling party or called party e-mail address, and a called number identifier. Then the consolidated list is communicated to a remote location responsive to a subscriber request. Such a remote location can be a general purpose computing device equipped with a web browser, an Internet-enabled phone, or a similar device. In other aspects, services may include at least a plain old telephone service, wireless service, and/or a long distance telephone service.

In another aspect, a system provides subscriber-related call log information for a plurality of network services to a plurality of subscribers. The system features a remotely accessible platform configured to receive a plurality of call log information for the network services. A communications network provides data communications between a plurality of subscribers. A call log database is operatively coupled to the platform so that the call log database stores the call log information on a subscriber-by-subscriber basis. The platform is configured to consolidate the call log information and is configured to communicate the consolidated information responsive to a subscriber request sent via the communications network. In this way, a subscriber can advantageously receive and manipulate call log information.

In another aspect of the invention, end-user telephony devices may be programmed with operational logic to generate calling records data and transfer the records to a consolidating platform. This can be accomplished for data-capable telephony devices, such as cellular phones with data functions, PCS wireless phones, VoIP phones, Voice-over-Cable devices, Voice-over-DSL devices, and other devices that place voice calls on a data network to homes and offices.

BRIEF DESCRIPTION OF THE DRAWINGS

The foregoing summary of the invention, as well as the following detailed description of the preferred embodiments, is better understood when read in conjunction with the accompanying drawings, which are included by way of example and not by way of limitation with regard to the claimed invention:

DETAILED DESCRIPTION OF THE INVENTION

Figure 1:
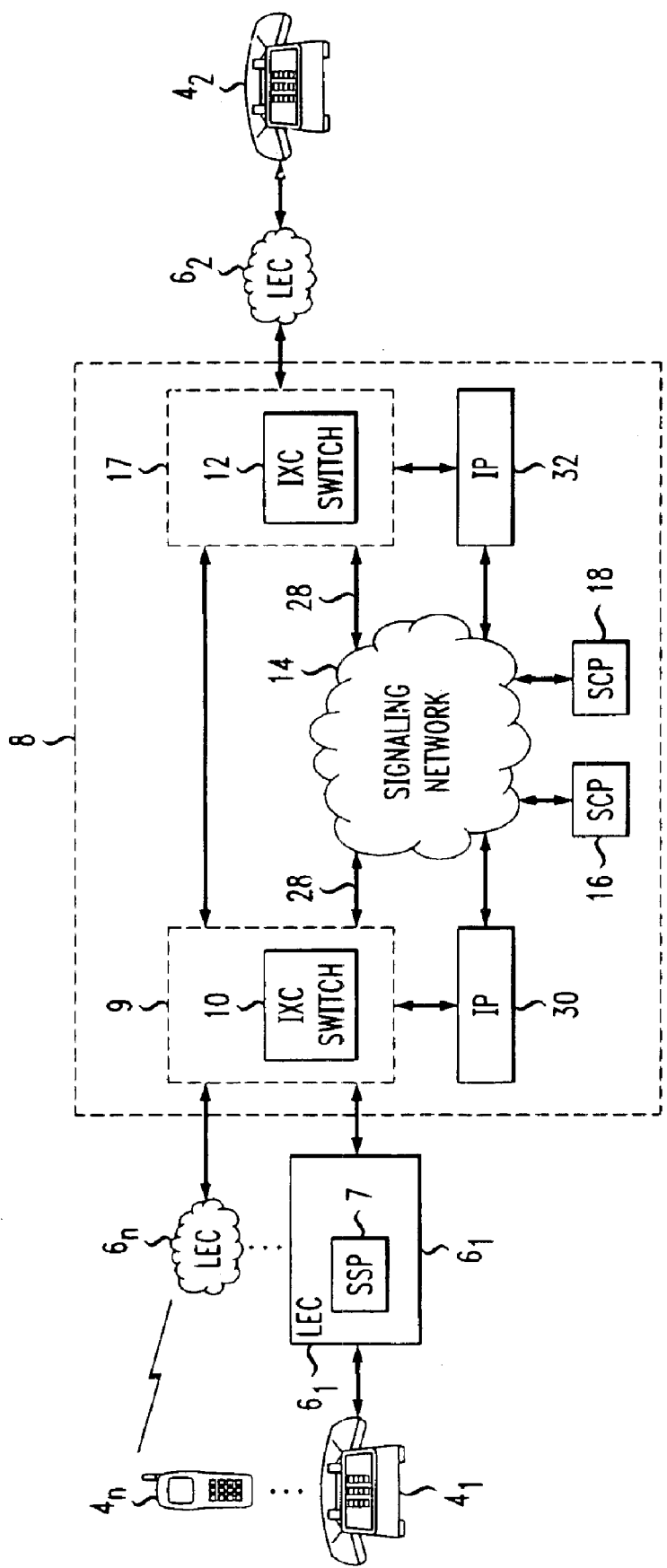
FIG. 1 is a schematic diagram of a telecommunication network environment in which an embodiment of the invention may be implemented.

FIG. 1 illustrates a schematic diagram of a telecommunications network 2, including an Advanced Intelligent Network (AIN) for providing telephone service to one or more customers $4_1, 4_2 \ldots 4_n$ (where n is an integer and the number of subscribers), including providing network-based subscriber-related call log information upon a request from the subscriber. The operation of the network 2 will be briefly described followed by a description of implementing a method and system of providing subscriber-related call log information for a plurality of services from a remotely accessible server in which the services include at least a plain old telephone service (POTS), wireless service, and prepaid telephone service.

In an embodiment of the invention, a subscriber for each service may enroll a telephone number or multiple telephone numbers for each service that any calls that are received at the enrolled telephone numbers or made from the telephone numbers result in a detailed call record stored in a consolidated network platform 100 more fully described with reference to FIG. 3. The call record may have data values, such as the calling party telephone number and calling party name and address, or wireless number can be implemented in an embodiment of the invention. The consolidated network platform 100 facilitates a subscriber to have interactive control of a consolidated list of telephone numbers for the plurality of services.

With continued reference to FIG. 1, network 2 may include a plurality of local Exchange Carrier Networks (LEC) $6_1, 6_2, \ldots 6_n$, each providing local POTS service to a corresponding one of the telephone devices, including wireless phones connected to LEC $6_n$. For example, LEC $6_1$ comprises one or more Services Switching Points (SSP) 7 including local switches with associated software to process and route a plurality of telephone calls made by the subscribers. Regarding LEC $6_n$, subscriber $4_n$ may make and receive calls through an individual cell site (not shown) or a succession of cell sites connected to one of a pair of Mobile Telephone Switching Offices (not shown). While FIG. 1 depicts a separate LEC for each subscriber, a single LEC may include a plurality of local switches and may serve a plurality of individual subscribers for wire-line or wireless services.

In the illustrated embodiment, customers $4_1, 4_2, \ldots 4_n$ using long distance telephone service receive such service form an Inter-eXchange Carrier (IXC) network 8, such as the network maintained by At&T Corp. The network 8 includes at least one, and typically a plurality of, interconnected toll switches, represented by the switches 10 and 12 within one LEC. Service Switching Points (SSP) 9 and 17 that are linked to at least one LEC. Although FIG. 1 depicts only the two toll switches 10 and 12 within the IXC network 8, the network may typically include a plurality of such interconnected switches. In an example, customer $4_1$ makes an outgoing long distance call to customer $4_2$. Each toll switch, such as switch 10, that is linked to a LEC, such as LEC $6_1$, routes the call received from its associated LEC to another toll switch, for example switch 12, within the network 8. The receiving toll switch (e.g., switch 12) routes the call to the destination LEC (e.g., LEC 62) either directly, if the switch serves that LEC, or through one or more switches (not shown).

Network 2 also includes a signaling network 14 comprised of network elements, including intelligent controlling computers, such as service control points (SCPs) 16 and 18, and intelligent peripherals (IPs) 30 and 32, such as voice processing platforms, announcement platforms and messaging platforms. SCPs 16 and 18 include a plurality of service package applications that are used for providing advanced telecommunications services to the subscribers via the AIN. Signaling network 14 links the SSPs 9, 17 and SCPs 16, 18 for providing the advanced telecommunications services. The signaling network includes hardware and software for transmitting call control information between the toll switches and intelligent peripherals, or other specialized resources, as is known in the telephony art. It should be appreciated that the signaling network may include high bandwidth data lines 28, such as ATM lines for sending control information. The signaling network employs software, such as Signal System No. 7 (SS7), for signaling protocols, which is known to those skilled in the telephony art.

Figure 2:
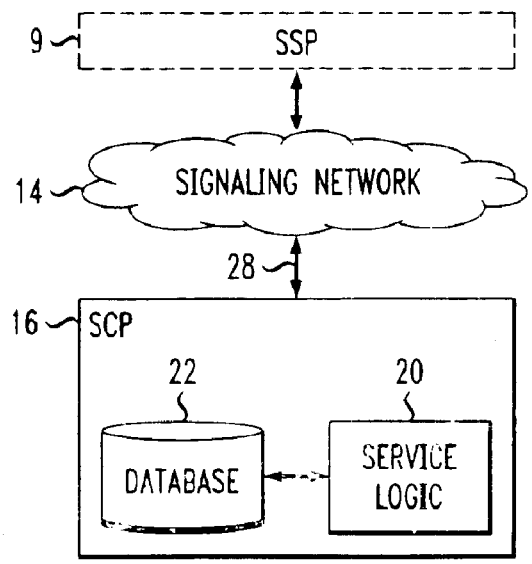
FIG. 2 is a schematic diagram of a portion of the telecommunication network environment of FIG. 1.
Figure 3:
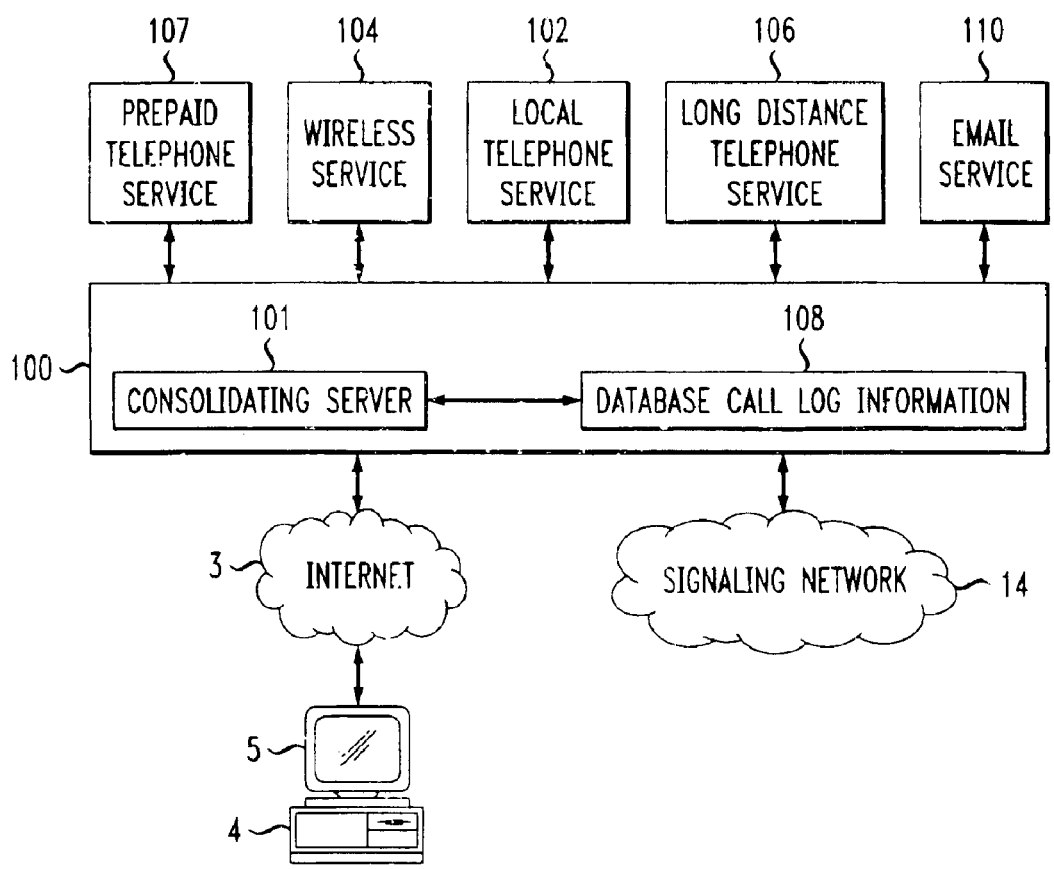
FIG. 3 is a schematic diagram of a system according to the teachings of the present invention.

According to an embodiment of the invention, as seen in FIG. 2, the SCP 16 may include a service package application having service logic 20 that executes a software program in which calling record data is transferred to the network consolidating platform 100 (see FIG. 3). As a functional overview, SCP 16 may include a database 22 and the service package application for transferring the calling record data. Database 22 retains call plan information of the subscriber to the IXC network. Service logic 20 includes programmed instructions to obtain the calling party telephone number via automatic number identification (ANI).

FIG. 3 illustrates a schematic representation of consolidating network platform 100 at a node of telecommunications network 2 for providing subscriber-related call log information for a plurality of distributed services to a plurality of subscribers. The distributed services may include a local plain old telephone service (POTS) 102, a wireless service 104, a long distance telephone service 106, a prepaid telephone service 107, and email service 110. Network platform 100 includes a remotely accessible consolidating server 101 configured to receive the call log information from the services 102–107. A remotely accessible computer readable database 108 stores the call log information and is connected to the server 101. The server 101 includes programmatic instructions to consolidate the call log information into the database 108. In addition, the server 101 is configured to communicate or transmit the consolidated information to a subscriber via a data network 3, such as the Internet, in response to a request from a subscriber.

Consolidating server 101 may execute one or more application programs, such as web-applications for displaying web pages and/or conducting electronic commerce transactions associated with the subscriber information.

Consolidating server 101 may be a general purpose computing unit, including one or more central processing units (not shown), a system memory (not shown), and a system bus (not shown) that operatively connects various system components. The system bus may be any one of several types of conventional structures. The general purpose computing unit may use any number of operating systems, such as MICROSOFT WINDOWS®, WINDOWS NT®, WINDOWS XP®, UNIX®, or LINUX®. The system memory includes read only memory ("ROM") and random access memory ("RAM"). The general purpose computing unit can be any host computer system configured to operate with devices using the TCP/IP protocol. It should be recognized that the host computer includes networking software and a network interface to send and receive data packets from network 3, such as the Internet.

Consolidating server 101 may include a computer-readable storage device that may include one or more magnetic disk drives or, alternatively, an optical disk drive such as a Compact Disk ROM, or a DVD drive. According to an embodiment of the invention, the computer-readable storage device includes a computer-readable medium containing programmed steps for processing subscriber-related call log information.

Figure 4:
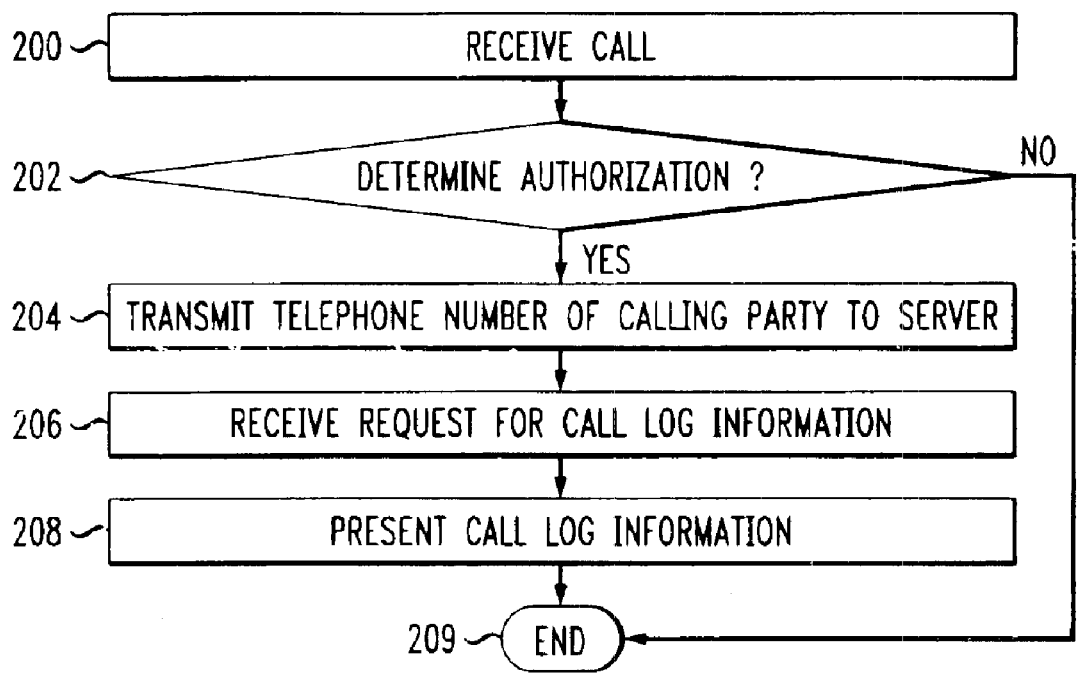
FIG. 4 is a high-level flow diagram of a method of providing a network-based subscriber-related call log information feature.

FIG. 4 illustrates a method of providing a network-based subscriber-related call log information feature. The illustrated approach may be implemented in a service application package controlled by a designated service control point within the network. The present invention can also be implemented in a parallel processing manner, in which call processing for the call log information is performed at the same time as the telephone call is routed to the called party. Thus, the parallel approach enables the network to provide the calling log information during the progression of the call-setup.

With continued reference to FIG. 4, by way of example a person, such as calling party $4_1$, places a long distance telephone call from LEC $6_1$ through telecommunications network 2 to a subscriber, such as subscriber $4_2$, that is connected to LEC $6_2$. During the call-setup period for routing the call to the telecommunications device of subscriber $4_2$, SSP 9 having IXC switch 10 in IXC network 8 receives the telephone call at step 200. Upon receipt of the call, SSP 9 may verify if subscriber $4_2$ has registered or is authorized to receive advanced telecommunication service provided by IXC network 8 for network-based subscriber related call information of the present invention. The verification can be accomplished in a number of ways.

In one approach, SSP 9 may launch a request via signaling network 14 to SCP 16 to determine what special predetermined handling is associated with the call. SCP 16 receives the query about the call at step 200 shown in FIG. 4. SCP 16, having the service application package of the present invention, may consult database 22 for a customer record (at step 202) to determine whether the called party $4_2$ is to receive the network based call tracking feature. In one aspect, a network-based call tracking feature may include the instructions for processing the telephone call that refer to the transmission of the phone number and calling name information. If the subscriber is indeed authorized, as determined at step 202, then further action is first taken in accordance with the illustrated embodiment at step 204. If the subscriber is not authorized or not registered, then SCP 16 ends the processing for the network-based call tracking feature at step 209.

At step 204, SCP 16 sends the telephone number of the calling party and name (if available) to the consolidating server 101. To accomplish this, the Initial Message Address (IAM) information can be extracted, for example. Alternatively, the subscriber telephone sends its own telephone number and the telephone number of the called party, and a time stamp, to the consolidating server 101. At step 206, a subscriber, such as subscriber $4_2$, may access the network platform 100, via the Internet, preferably by way of the World Wide Web. It is recognized that the subscriber may use equipment configured with conventional browsers or browser-like devices to view the information. Web-browsing software is widely available for computers, wireless phones, and personal digital assistants. Optionally, Java™ software applets may be incorporated in the web page. The web page may be written in a number of ways, such as Hyper Text Markup Language (HTML) or Extensible Markup Language (XML). A subscriber can send a HyperText Transfer Protocol (HTTP) request to platform 100. Other variations of a HTTP request are contemplated to be within the scope of the invention, such as a secure sockets layer (SSL), secure HTTP (HTTPS) type, or the HTTP Next Generation (HTTP-NG) protocol. Nevertheless, the request may be any appropriate Internet protocol component for network communications for accessing a web site.

In one arrangement, upon being connected with the consolidating server 101 in the network platform 100 and the associated access web page 5 on computer monitor of the subscriber 4 (see FIG. 3), the subscriber may be prompted by the server 101 or other device to provide an authentication code and/or password. If the subscriber provides the proper code, the subscriber can view and manipulate the call log information. Alternatively, a firewall or a security server may control access to the network platform 100, including consolidating server 101. More generally, any visual interface that displays data transferred across a data network from the consolidating server 101 can provide access to view the call log information. In this manner, the call log information can be easily retrieved and used by the subscriber.

It should be recognized that all outbound calls made by subscriber $4_2$ also will be tracked and sent to the consolidating server 101. At step 208, the call log information is presented to the subscriber via a web page (not shown). The subscriber is enabled to use reverse directory look-ups, such as conventionally performed on the World Wide Web with an ANYWHO® server provided by AT&T Corp. Further, the electronic mail address of the calling party telephone may be obtained from an electronic mail service 110 (see FIG. 3).

In an alternative embodiment, in an ENUM environment, it is possible for the call log information to be locatable via the Internet 3 by using a telephone number of the calling party. The term "ENUM" refers to an Internet Engineering Task Force (IETF) protocol that takes an international telephone number and translates that number into a Uniform Resource Locator (URL) for a Domain Name System (DNS). The protocol is commonly called RFC 2916, which is herein fully incorporated by reference. One of ordinary skill in the art would recognize the ENUM standard includes a predetermined domain name of E164.arpa. However, other domain names with a translated telephone number for an addressable domain name are within the scope of the invention. Nevertheless, assuming the telephone number of the calling party is registered in an ENUM domain name server, the consolidation server 101 can send an ENUM request for a registered electronic mail address mapped to the telephone number. The electronic mail address of the calling party will then be passed to the consolidating server 101.

It should be understood that telecommunications network 2 may include a plurality of differing networks, for example, a local, national, international telecommunications network, cellular, or Personal Communication Services (PCS) network, Internet, cable television and/or any other suitable networks. While the embodiments described relate to communications networks including a Public Switched Telephone Network (PSTN), a wireless telecommunications network, a broadband network, a CATV network providing telephony, a satellite telecommunications network, Internet, a private branch exchange system, or a wireless Centrex system, it is to be understood that the embodiments of the invention can be applied to all types of telecommunications systems and networks. A wireless network may have a host of services such as text messaging for wireless phones or other services like the well-known Wireless Application Protocol ("WAP") for operating devices in a Wireless Application Environment ("WAE").

It will be appreciated that the network connections shown are exemplary and other methods or ways of establishing a communications links may be used. It should be appreciated that subscribers $4_1$, $4_2$ . . . $4_n$ may use any device that provides telephony, such as a wire-line telephone, a wireless telephony device, a personal computer (not shown) or a laptop with a voice modem (not shown), a telephony-enabled personal digital assistant (not shown), a palm-sized computer (not shown), a IP-enabled telephone (not shown).

Figure 5:
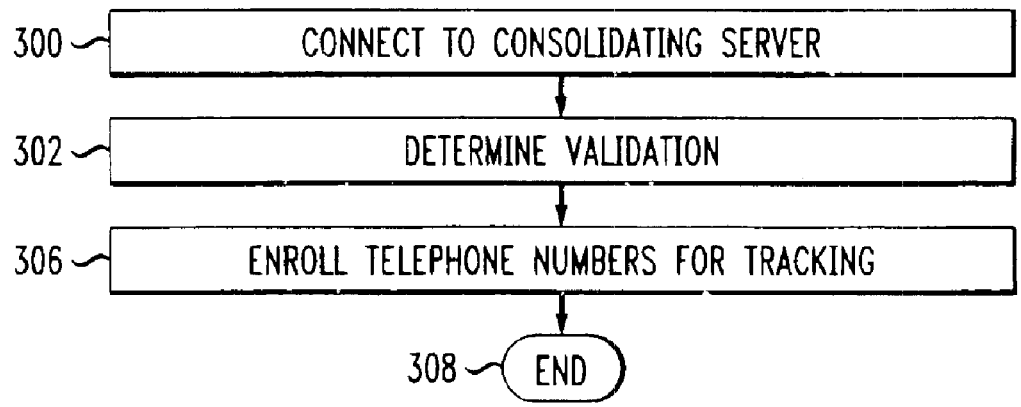
FIG. 5 is a high-level flow diagram of a method of enrolling a telephone number for subscriber-related call log information.

Referring to FIG. 5, a flow diagram illustrates an embodiment of a method of enrolling the telephone number into the network to obtain the calling record data. At step 300, a user or subscriber connects to the telecommunication network 2 having consolidating server 101 functionally linked to SCP 16 and 18. In one embodiment, the subscriber may access a predetermined telephone number, such as a toll-free number, associated with the system in which the telecommunications access network may be the Public Switched Telecommunications Network. In this embodiment, the platform 100 may include interactive voice response, voice command input, or manned operator services. In an alternative embodiment, the subscriber may access a uniform resource locator (URL) associated with the platform 100 wherein the telecommunications access network is connected to the Internet 3. Additionally, the uniform resource locator can include a web page on the World Wide Web linked to a remote Web server (not shown), which provides access to the platform.

At step 302, the subscriber is validated for the platform 100. Subscriber validation may also be determined in a number of ways. In one approach, validation can include entering a Personal Identification Number (PIN) or password prior to platform 100 enabling provisioning thereof. If the access is validated, then the user may proceed. If access is not validated, a call may be transferred to a fraud control center or customer service. In an alternative embodiment, if remote access was unsuccessful, then unauthorized access data can be noted or transferred for network security operations. At step 306, the subscriber enters the telephone numbers which they want tracked. The telephone numbers can include a residence number, office number, wireless phone number, etc. Therefore, all calls made from any phone number enrolled in the platform 100 can be tracked. At step 308, the process generally ends.

In an alternate embodiment of the present invention, end-user or customer devices may be programmed with application logic to generate calling records data and transfer the records to the consolidating platform 100 (see FIG. 3). This can be accomplished for data-capable telephony devices, such as cellular phones with data functions, PCS wireless phones, VoIP phones, Voice-over-Cable devices, Voice-over-DSL devices, and other devices that place voice calls on a data network to homes and offices.

Alternatively, standard tip-ring telephones, connected to the Public Switched Telephone Network (PSTN) such as network 2, can be configured to generate calling logs that are transmitted to consolidating server 101 through DTMF signaling. By way of example, a tip-ring telephone can be built that can store a set of call records in an internal storage, such as a computer-readable memory. At a pre-programmed time point (for example, at night time period), the phone can be configured to automatically dial out through the PSTN to the consolidating server 101, transfer any stored call records to the consolidating server 101 with in-band DTMF signaling, and then clear its internal record storage.

In one embodiment of the present invention, a telephony device is equipped with a processor and a wireless radio technology employing a protocol, such as Bluetooth™, 802.11b or other equivalent wireless network protocol. A telephony device so equipped can serve as a transfer hub 400 (see FIG. 6). This arrangement creates a Wireless Personal Local Area Network (WPLAN) operating between the devices. Call record details from other devices including cellular phones and wireless devices can be uploaded to this transfer hub for later transmission to the consolidating server 101. The transfer hub 400 would be operably coupled to the consolidating platform 100 via Internet network 3 or the PSTN.

Figure 6:
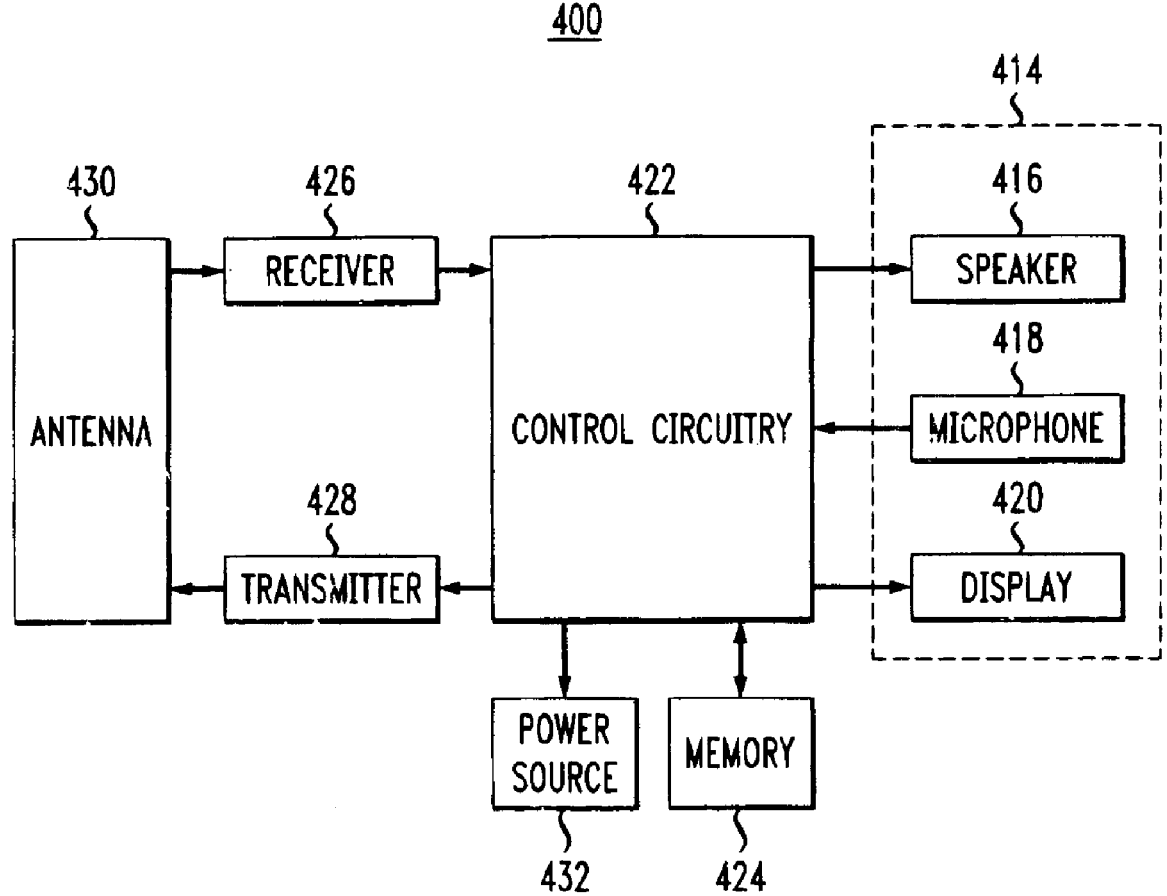
FIG. 6 is a schematic representation of a call log transfer hub for storing and transmitting subscriber related call log information.

FIG. 6 illustrates a schematic representation of an embodiment of a transfer hub 400. Transfer hub 400 may include electronic components and software including a user interface 414, a control circuitry 422, a memory 424, a receiver 426, a transmitter 428, an antenna 430, and an electric power source 432. User interface 414 is the part of the transfer hub 400 that provides audio and visual signals to a user. The user interface 414 is operatively connected to the control circuitry 422. The user interface 414 may optionally include a speaker device 416, a microphone device 418, and a display device 420. The speaker device 416 provides audible signals to the user of hub 400. The microphone device 418 receives audio input from the user and converts the signals into the appropriate format for the control circuitry 422 to use the signals. The display device 420 provides visual signals to the user in the form of alphanumeric characters, colors or graphical symbols. The display device 420 may be any well-known device used in wireless communication devices, such as a liquid crystal display.

The control circuitry 422 may include a microprocessor (not shown) and digital signal processor (not shown) for use on digital networks. Also control circuitry 422 may include microsoftware and network interface software that facilitates the hub 400 to connect to a WPLAN.

The control circuitry 422 is operatively coupled to receiver 426, transmitter 428, and memory 424. Memory 424 stores data installed or programmed by the user, including the call log information such as telephone phone numbers, individual names, calling party designations, web addresses, e-mail addresses or other similar data. Further, memory 424 may be configured to store the call log information transferred from the end-user devices via Bluetooth™, 802.11b or other equivalent wireless network protocol. Memory 424 may be any programmable type in which nonvolatile storage can be electrically erased and reprogrammed. Possible alternatives include flash memory, flash ROM, RAM with battery backup. The receiver 426, transmitter 428 and antenna 430 provide the function of facilitating hub 400 to connect to the other end-user devices. The receiver 426 is operatively coupled to the antenna 430 for receiving a wireless communication payload, including call log information. The transmitter 428 is also operatively coupled to the antenna 430 for sending a wireless communication payload.

In one arrangement, a communications radio link in accordance with the Bluetooth™ Global Specification for wireless connectivity may be implemented to transmit call log information between the end-user devices and the transfer hub 400. It should be appreciated that conventional Bluetooth™ technology was introduced to provide connectivity between portable devices like mobile phones, laptops, personal digital assistants (PDAs), and other nomadic devices up to a w range of approximately 100 meters. Bluetooth-enabled devices operate in an unlicensed Instrumentation, Scientific, Medical (ISM) band at 2.4 GHz. This system uses frequency-hopping to enable the construction of low-power, low-cost radio devices with a small footprint. The Bluetooth-enabled devices transmit and receive on 79 different hop frequencies from 2402 to 2480 MHz, switching between one hop frequency to another in a pseudo-random sequence, 1600 times a second. The gross data rate is 1 Mb/s. A time-division duplex scheme is used for full-duplex transmission. One of ordinary skill in the art should recognize a Bluetooth-enabled system supports both data and voice communications.

According to the teachings of the present invention, the generation of calling records from the end-user devices compliments the approach of having a Service Control Point (SCP) generate the call log information. In the SCP arrangement, subscriber telephony calls from any device will be recorded as long as the call passes through a network service provider that generates the records and sends them to the consolidating server 100 that serves that particular subscriber. In the user end-device arrangement, a subscriber can use a call log data recording service independent of the network that carries the call. In an embodiment of the invention, a subscription service for the call logs can also mix the two types of sources of call data records (e.g., end-user devices generated and network-based generated call log data). A single consolidating server can accept and integrate call log data records from both SCPs and end-user devices.

While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation or material to the teachings of the invention without departing from its scope. Therefore, it is intended that the invention not be limited to the particular embodiment disclosed, but that the invention include all embodiments falling within the scope of the appended claims.

What is claimed is:

1. In an intelligent network, a method of providing subscriber-related call log information for a plurality of services from a remotely accessible server, the services including at least a plain old telephone service, and a wireless service, the method comprising the steps of:
   receiving the call log information for the plurality of services;
   storing the call log information;
   consolidating the call log information as a consolidated list sorted by at least one of name of a remote party, a telephone number of the remote party and an electronic mail address of the remote party wherein said remote party is a calling party or a called party, or combinations thereof; and
   communicating the consolidated list to a computing device responsive to a subscriber request.

2. The method of claim 1, wherein the plain old telephone service includes a long distance service and a local telephone service.

3. The method of claim 1, further comprising a step of receiving an electronic numbering request for the telephone number of the remote party.

4. The method of claim 3, further comprising a step of receiving a command to perform a reverse directory look-up of the remote party.

5. The method of claim 1, wherein the step of receiving the call log information includes a step of receiving the call log information from a remote hub device.

6. The method of claim 5, further comprising a step of the remote hub device receiving the call log information from a wireless telephony device.

7. The method of claim 6, wherein the wireless telephony device is Bluetooth-enabled.

8. The method of claim 1, wherein the call log information is received from a service control point.

9. A method of providing subscriber-related call log information from a telecommunications network, the method comprising the steps of:
   receiving the call log information;
   storing the call log information in a computer-readable storage device;
   consolidating the call log information as a consolidated list sorted by at least one of name of a remote party, a telephone number of the remote party and an electronic mail address of the remote party wherein said remote party is a calling party, or a called party, or combinations thereof; and
   transferring the consolidated list to a call log platform configured to be remotely accessible.

10. The method of claim 9, further comprising a step of communicating the consolidated list to a computing device responsive to a subscriber request.

11. The method of claim 10, wherein the step of transferring the consolidated list includes a step of transferring the consolidated list from a transfer hub.

12. The method of claim 11, wherein the step of transferring the consolidated list further includes a step of accessing a Public Switched Telephone Network.

13. The method of claim 11, wherein the step of transferring the consolidated list further includes a step of accessing an Internet Protocol Network.

14. The method of claim 11, wherein said transfer hub is Bluetooth-enabled.

15. A method of providing subscriber-related call log information for a plurality of network services to a plurality of subscribers, the method comprising the steps of:
   operatively connecting a remote device to a call log platform, the call log platform including a call log server and a call log database, the call log database configured for retaining call log information related to said plurality of subscribers wherein said call log information includes data on a remote party, said remote party is a calling party, or a called party, or combinations thereof;
   determining authentication for the remote device; and
   receiving a telephony address for tracking related to the plurality of network services.

16. The method of claim 15, further including a step of tracking the telephony address and storing the call log information for the telephony addresses in the call log database.

17. The method of claim 16, further including consolidating the call log information as a consolidated list sorted by at least one of a name of said remote party associated with the telephony address, and an electronic mail address associated with the telephony address.

18. The method of claim 15 further including communicating the consolidated list to the subscriber upon request.

19. A system for providing subscriber-related call log information for a plurality of network services to a plurality of subscribers, the services including at least a plain old telephone service and a wireless telephony service, the system comprising:
   a remotely accessible platform operable to receive a plurality of call log information for the network services wherein said call log information includes data on a calling party, or a called party, or a combination thereof;
   a communications network for providing data communications between a plurality of subscribers; and
   a call log database operatively coupled to the platform, the call log database for storing the call log information on a subscriber-by-subscriber basis, the platform being connected to the communications network, the platform configured to consolidate the call log information and configured to communicate the consolidated call log information responsive to a subscriber request sent via the communications network.

20. The system of claim 19, further including a telecommunications network coupled to the platform, the telecommunications network for processing voice communication between a plurality of telephony devices.

21. The system of claim 20, wherein the telecommunications network further includes a Service Control Point for providing the call log information to the platform.

22. The system of claim 19, wherein the platform further comprises an authentication element for validating the authorization of the subscribers to access the consolidated call log information residing on the call log database.

* * * * *